(12) United States Patent
Ambrozic et al.

(10) Patent No.: US 11,574,248 B2
(45) Date of Patent: Feb. 7, 2023

(54) SYSTEMS AND METHODS FOR AUTOMATED CONTENT CURATION USING SIGNATURE ANALYSIS

(71) Applicant: Rovi Guides, Inc., San Jose, CA (US)

(72) Inventors: Christopher Ambrozic, Chapel Hill, NC (US); Michael Dean Hoffman, Durham, NC (US)

(73) Assignee: Rovi Guides, Inc., San Jose, CA (US)

( * ) Notice: Subject to any disclaimer, the term of this patent is extended or adjusted under 35 U.S.C. 154(b) by 496 days.

(21) Appl. No.: 16/838,236

(22) Filed: Apr. 2, 2020

(65) Prior Publication Data

US 2021/0312318 A1    Oct. 7, 2021

(51) Int. Cl.
*H04N 21/44* (2011.01)
*G06N 20/00* (2019.01)
*H04N 21/466* (2011.01)

(52) U.S. Cl.
CPC ....... *G06N 20/00* (2019.01); *H04N 21/44008* (2013.01); *H04N 21/4663* (2013.01); *H04N 21/4666* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 5,870,754 A | 2/1999 | Dimitrova et al. | |
| 6,993,532 B1 | 1/2006 | Platt et al. | |
| 7,277,766 B1 | 10/2007 | Khan et al. | |
| 9,165,255 B1* | 10/2015 | Shetty | G06F 16/738 |
| 9,361,523 B1 | 6/2016 | Chen et al. | |
| 9,430,472 B2 | 8/2016 | Cheung | |
| 9,788,777 B1* | 10/2017 | Knight | G06Q 30/0269 |
| 2003/0221541 A1 | 12/2003 | Platt | |
| 2006/0112098 A1 | 5/2006 | Renshaw et al. | |
| 2007/0101147 A1 | 5/2007 | Brunk et al. | |
| 2008/0235267 A1 | 9/2008 | Aprea et al. | |
| 2009/0055006 A1 | 2/2009 | Asano | |
| 2010/0325135 A1* | 12/2010 | Chen | G10H 1/0008 707/769 |
| 2015/0293928 A1 | 10/2015 | Chen et al. | |

(Continued)

OTHER PUBLICATIONS

U.S. Appl. No. 16/698,618, filed Nov. 27, 2019, Menendez.

(Continued)

*Primary Examiner* — Jefferey F Harold
*Assistant Examiner* — Charles N Hicks
(74) *Attorney, Agent, or Firm* — Haley Guiliano LLP

(57) ABSTRACT

Systems and methods are described herein for curating content that follows a narrative structure. A narrative structure comprises narrative portions that have a defined order. Signature analysis of known content that follows the narrative structure is used to train machine learning models for the narrative structure and the narrative portions that make up the narrative structure. Signature analysis of candidate content segments, along with machine learning models for the narrative portions, are used to identify candidate content segments that match the respective narrative portions. A candidate playlist is generated of the identified candidate content segments in the defined order. In one embodiment, the machine learning model for the narrative structure is used to validate the generated playlist.

20 Claims, 10 Drawing Sheets

(56) References Cited

U.S. PATENT DOCUMENTS

| | | |
|---|---|---|
| 2015/0310307 A1 | 10/2015 | Gopalan |
| 2016/0188981 A1 | 6/2016 | Doerring et al. |
| 2016/0283796 A1 | 9/2016 | Henry |
| 2016/0286285 A1 | 9/2016 | Geyzel et al. |
| 2018/0020243 A1 | 1/2018 | Ni et al. |
| 2021/0160572 A1 | 5/2021 | Menendez |

OTHER PUBLICATIONS

U.S. Appl. No. 16/698,625, filed Nov. 27, 2019, Menendez.
U.S. Appl. No. 62/979,785, filed Feb. 21, 2020, Punja et al.
U.S. Appl. No. 62/979,784, filed Feb. 21, 2020, Punja et al.

* cited by examiner

1000

1002
Identify One or More Candidate Segments Among a Plurality of Segments of a Candidate Content that Caused Candidate Playlist to not Match with the Content Machine Learning Model

1004
Retrieve One or More New Candidate Segment Segments

1006
Replace the Identified One or More Candidate Segments with the Retrieved One or More New Candidate Segments

1008
Generate a Modified Candidate Playlist Using the Replaced Candidate Segment(s)

FIG. 10

SYSTEMS AND METHODS FOR AUTOMATED CONTENT CURATION USING SIGNATURE ANALYSIS

BACKGROUND

The present disclosure is directed to content curation, and more particularly, to automated content curation based on content analysis using one or more machine learning models.

SUMMARY

Currently an abundant amount of content is available online, including, for example, short content segments. As short form content becomes more prevalent, keeping viewers engaged for long periods of time becomes a challenge. This is mainly due to the fact that navigating content, and particularly content segments such as video, is burdensome and lacks cohesiveness between the segments. A variety of subject material available makes it difficult to connect pieces of content. Thus, a user may thus lose interest watching such content. However, there is also known good content that is engaging for the user. Such known good content may follow a narrative structure. For example, a movie may have multiple scenes corresponding to a story narrative having narrative portions such as an opening, inciting incident, rising action, climax, falling action and resolution. Such a narrative structure keeps a user engaged in the content. Thus, there is a need to curate content, such as content segments, that follow a narrative structure in a defined order or layout, which not only provides coherency between the segments but also maintains the user's interest in the content.

Content curation reflects various content segments in a content to provide coherency when assembled together to create a playlist. In one embodiment, the playlist is media content. Some examples of media content include audio, video, text, augmented reality (AR), virtual reality (VR), etc. Content curation includes providing signature analysis of at least one content segment (e.g., segment signature vectors of content segments). A signature vector contains information describing important characteristics of the content segment. Using signature analysis of the content segments (e.g. based on audio or video frames of the content), a curation system causes content to be curated based on analysis of the segment signature vectors using a machine learning model. For example, a user may wish to see a sci-fi adventure movie. A variety of video scenes on a sci-fi adventure movie, e.g., "The Empire Strikes Back" are available online. Some known good video frames for this movie that follows a narrative structure in a defined order include, e.g., an opening scene with hero, Luke Skywalker hiding from the Empire, a conflict scene with villain Darth Vader, a resolution scene where Luke Skywalker triumphs and equilibrium is restored in the Empire. Segment signature vectors of video segments available online are compared with signature vectors of the good video scenes (e.g., embodied in one or more machine learning models) to create a video playlist based on, for example, "The Empire Strikes Back" and other known good sci-fi adventure movies. It will be understood that the foregoing movie example is merely illustrative and other types of playlist content can be curated in accordance with the present disclosure, such as, for example, music, books, magazines, newspapers, and blogs, which follow narrative structures.

Systems and methods are described herein for curating content by training machine learning models. In some embodiments of the present disclosure, there is provided a system that retrieves content items (e.g., similar known good content items) that each comprise a plurality of content segments that follow a narrative structure (e.g., a romantic comedy). The narrative structure comprises a plurality of narrative portions having a temporal order, where the content segments for each content item correspond to respective narrative portions of the narrative structure. For each portion of the narrative structure, segment signature vectors are generated based on the content segments of the content items corresponding to that portion. Each set of segment signature vectors represent characteristics of content segments of the known good content that correspond to a narrative portion. For example, the first narrative portion of a romantic comedy may be of an unfilled desire and the first set of segment signature vectors may represent characteristics of unfilled desire. For example, the segment signature vectors may indicate scenes with a single actor or actress. The scenes may follow a relatively slow or calm pace and the audio level may be low to medium sound level without significant variation in sound level or tempo. Each of the segment signature vectors may include tens or hundreds of different types of signature information.

The system, for each portion of the narrative structure, trains a segment machine learning model based on the segment signature vectors corresponding to the portion being trained. The trained segment machine learning models are usable to identify candidate content segments for generating a candidate playlist that follows the narrative structure. For example, the segment machine learning model for the first portion of a romantic comedy is usable to identify candidate content segments of unfilled desire that are similar to the unfilled desire portions of the known good romantic comedies used to train the model.

The system, for each content item of the retrieved content items, generates a content signature vector based on the content item to generate a plurality of content signature vectors. In some embodiments, each content signature vector represents characteristics of the content item across the entire narrative structure. The system then trains a content machine learning model based on the content signature vectors. The trained content machine learning model is usable to validate the candidate playlist. It will be understood that while the segment machine learning models may accurately identify candidate content segments that correspond to the different portions of a romantic comedy, the candidate content segments may lack cohesiveness when combined in a playlist. For example, if the main character in the first segment is a female and the main character in the second segment is instead a male, the main character may change too drastically between segments and thus lack cohesiveness. However, the content machine learning model may be able identify this variation across the narrative structure and may not validate such a candidate playlist.

The system then outputs the segment machine learning models and the content machine learning model for generating one or more playlists. For example, the system may make the models available to users to create customized playlists based on desired narrative structures. As another example, the models may be outputted to server, which makes playlists of content that are selectable by users. As another example, the models may be outputted to user equipment to enable users to create playlists from local content.

In some embodiments, the trained segment machine learning models and the trained content machine learning model each comprise a neural network and together they form a generative adversarial network (GAN). The GAN include a discriminator module (e.g., the content machine learning model) that compares a generated candidate playlist with "authentic," approved, and/or previously distributed playlists. If the discriminator fails to "pass" the candidate playlist, factors pertaining to the failure may be fed back into the segment machine learning models in order to improve or modify the candidate playlist to more closely represent an approved or authentic playlist. For example, the discriminator module may determine if the features included in the candidate playlist flow together naturally (e.g., an actor visually looks similar across the segments of the candidate playlist). In addition, the discriminator module itself may also be reprogrammed and/or modified via a feedback loop. In some embodiments, both the segment machine learning models and the discriminator module may be fine-tuned in parallel.

In some embodiments of the present disclosure, the system applies the segment machine learning models and the content machine learning model to curate content. In one embodiment, the system analyzes segment signature vectors of candidate segments to be curated using the segment machine learning models to identify segment signature vectors that match with the content segments of the known good content. The system then identifies candidate segments that corresponds to the identified segment signature vectors and assembles the candidate segments to generate a candidate playlist.

In some embodiments of the present disclosure, the system analyzes the entire content of the candidate playlist using a content machine learning model to determine whether the content vector signatures of the entire playlist matches with the content vector signatures of the known good content. In some embodiments, when there is a match, the system determines that the playlist is validated. In some embodiments, the system distributes the validated playlist to the user. In some embodiments, the system updates the segment machine learning models and the content machine learning model based on the validated playlist.

In some embodiments of the present disclosure, when there is no match, the system identifies one or more of the candidate segments that caused the content signature vector of the candidate playlist to not match. In some embodiments, the system modifies the candidate playlist by replacing the identified one or more candidate segments with different candidate segments. In some embodiments, the system applies the segment machine learning models and the content machine learning model to the modified playlist.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 depicts a flowchart of an illustrative process for modifying the generated candidate playlist, in accordance with some embodiments of the disclosure.

DETAILED DESCRIPTION

Figure 1:
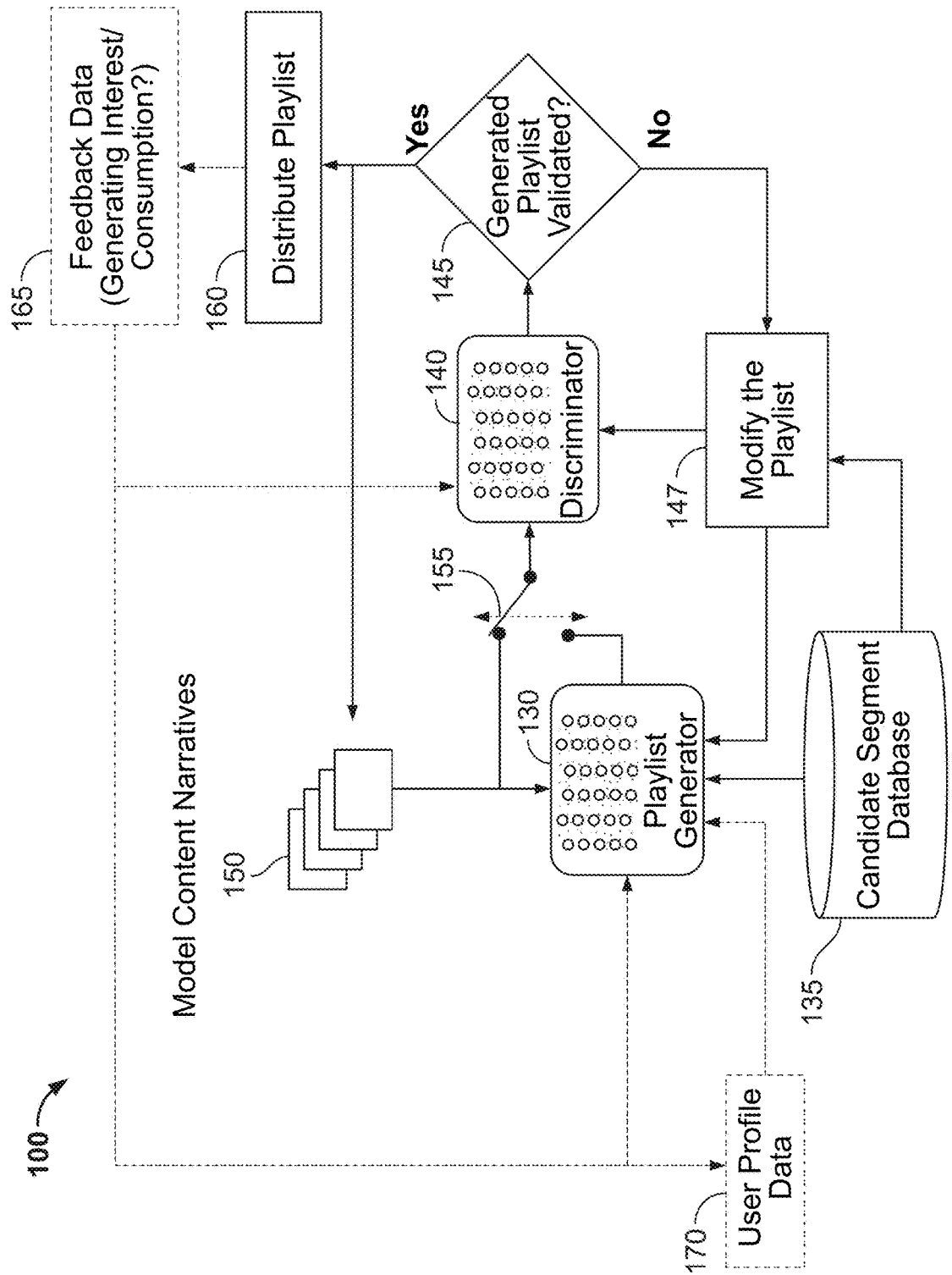
FIG. 1 shows an illustrative flowchart of a system for curating content according to some embodiments of the disclosure.

As referred to herein, the term "signature vector" refers to signature analysis of characteristics corresponding to at least one frame/segment of content. In one embodiment, content is a media content. Some examples of media content include audio, video, text, AR, VR, etc. A signature vector represents information describing important characteristics of the content. As referred to herein, in some embodiments, a signature vector is generated based on frames of the content segment. In some embodiments, the segment signature vector is generated based on the entire content or a segment of content. In one embodiment, a signature vector represents characteristics associated with one or more audio segments or tracks of content. In one example, a signature vector may include signature analysis of a frequency range of the audio, such as background noise, foreground noise, volume of voice of character, pitch of the voice etc. in an audio track of the content. For example, when content is of a beach scene with the ocean, waves of the ocean make sound that have certain characteristics that can be identified using signature analysis. As another example, a signature vector may include natural language processing of audio of text. In one embodiment, a signature vector represents characteristics associated with one or more video frames of the content. Such characteristics includes texture, intensity (light), background color, weather character information (type or number), image recognition of characters, temporal data, etc. corresponding to at least one frame of a video. For example, facial recognition of characters may determine that one of the characters is an adult white male while another is a child (e.g. boy or a girl). As referred to herein, the term "content" should be understood to mean any electronically consumable user asset, such as television programming, as well as pay-per-view programs, on-demand programs, Internet content (e.g., streaming content, downloadable content, or Webcasts), video, audio, playlists, electronic books, social media, applications, games, any other media, or any combination thereof. Content may be recorded, played, displayed or accessed by devices. As referred to herein, "content providers" are digital repositories, conduits, or both of content items. Content providers may include cable sources, over-the-top content providers, or other sources of content. As referred to herein, the term "content curation" refers to content curated using signature vector analysis. FIG. 1 shows an illustrative flowchart of a system 100 for curating content according to some embodiments of the disclosure. In one embodiment, system 100 is a generative adversarial neural network (GAN) machine learning system for generating curated content. In one embodiment, content is media content. Some examples of media content include audio, video, text, AR, VR, etc. In one embodiment, a playlist generator 130 retrieves candidate segments from a candidate segment database 135. In one embodiment the candidate segments are retrieved via a local network. In one embodiment, the candidate segments are retrieved via a communications network (e.g., communication network 604 of FIG. 6). The candidate segment database 135 may include multiple various candidate segments that include, for example, short content segments. In one embodiment, the segments may include content which does not follow a narrative structure. For example, the video segments may include short segments or segments extracted from or derived from larger content items. Thus, the candidate segments may lack consistency between them when they are not curated to follow a narrative structure. The playlist generator 130 uses segment machine learning models (See FIG. 3) to identify candidate segments in the database 135 that match narrative portions of a narrative structure. The playlist generator 130 assembles the identified candidate segments in the order of the narrative structure to generate a playlist of the identified candidate segments. In one embodiment, playlist generator 130 includes multiple versions of segment machine learning models for different types of narrative structures (e.g., sci-fi adventure, romantic comedy, murder mysteries, etc.).

In one embodiment, the playlist generator 130 may use user profile data 170 to determine particular preferences associated with a user. For example, playlist generator 130 can compare content consumption history provided in user profile data 170 (e.g., content browsing history, prior content consumption, social media patterns, etc.) to the candidate segment database 135, model content narratives 150, or the versions of segment machine learning models to determine a user preference for particular types or characteristics of content. In one example, the user profile data 170 may include one or more preferences for different lengths of time for different content. User profile data 170 may also include predetermined profile preferences. Using the determined user profile preference(s) and candidate segments as input, the playlist generator 130 may operate to generate a playlist of the identified candidate segments of interest to the user, which follow a narrative structure also of interest to the user. In one embodiment, the user inputs the user profile preference(s) to the content generator 130. In one embodiment, the playlist generator 130 retrieves the user profile preference(s) from the user profile data 170. For example, the playlist generator 130 may retrieve the length of time of content that a user desires from the user profile data 170 and identify/process segments such that when assembled together they fit into the length of time desired by the user.

In one embodiment, the playlist generator 130 is a machine learning model programmed to determine and generate content based upon candidate segments in the database 135, feedback data 165 and the user profile data 170. Some examples of the machine learning models are decision tree learning, adaboost, linear regression, logistic regression, multivariate adaptive regression, locally weighted learning, Bayesian, Gaussian, Bayes, neural network, generative adversarial network (GAN), and/or others known to those of ordinary skill in the art. Multiple models may be used with results combined, weighted, and/or otherwise compared in order to generate content.

After the playlist is generated, a comparison may be made between the generated playlist and the model content narratives 150 at 155 to validate the playlist. In one embodiment, the comparison is performed by a discriminator 140. In one embodiment, the discriminator 140 applies a content machine learning model (See FIG. 4) to validate the playlist. The playlist is validated to assure, for example, that the assembled content of the identified candidate segments has good consistency throughout the playlist. The discriminator 140 may apply analysis (e.g., signature vector analysis) and comparisons to determine if the generated playlist satisfies particular criteria pertaining to authentic/approved content/segments. Analysis/comparisons may include, for example, determining whether segments/content of the generated playlist sufficiently resemble the content or characteristics of the model content (e.g., as embodied in a content machine learning model). Various image processing functions (e.g., facial/object recognition, pattern matching, audio matching, etc.) may be employed to perform the analysis/comparisons. In one embodiment, the discriminator 140 is a machine learning model programmed to discriminate between passable content and those that failed discrimination. Some examples of the machine learning models are decision tree learning, adaboost, linear regression, logistic regression, multivariate adaptive regression, locally weighted learning, Bayesian, Gaussian, Bayes, neural network, generative adversarial network (GAN), and/or others known to those of ordinary skill in the art. Multiple models may be used with results combined, weighted, and/or otherwise compared in order to determine whether the generated content is validated or not. In one embodiment, the content generator 130 and the discriminator 140 are trained in conjunction to function together as the GAN machine learning system.

Based upon the analysis/comparisons, a determination is made about whether the generated playlist is validated at decision block 145. In one embodiment, if at decision block 145 it is determined that the playlist is validated, then the model content narratives 150 is updated with the playlist. In one embodiment, if at decision block 145 it is determined that the playlist is validated, then the playlist is distributed at block 160. A user may provide feedback on the distributed playlist. Feedback data 165 may include data indicating characteristics (of the frame or segment of the media content, e.g., text, audio, video, AR/VR) that should be introduced, removed, and/or modified in the generation of the playlist. Feedback data pertaining to the distribution of the playlist and related content consumption may be collected and received by the model content narratives 150 to update characteristics of the content in the model narrative and also used to store in and/or update the user profile data 170.

Feedback data regarding the approval or rejection of the content may be received by the playlist generator 130 and the discriminator 140. Feedback data may include, for example, rejections of particular identified content segments or characteristics within the content segments such as actors, scenes, backgrounds, and/or objects within the content curation. Feedback data may include data indicating attributes that should be introduced, removed, and/or modified in the curation. For example, feedback data may indicate a greater relative positive response (e.g., consumption of content) from particular profile types to particular image/content structure attributes. The neural network may thus be reprogrammed to strengthen a connection (association) between a particular profile and content structure attribute. Based upon the feedback, playlist generator 130 may generate/modify content curation and again output the newly generated content for further processing by discriminator module 140. The cycle may continue until a satisfactory playlist is generated and/or a particular threshold of rejections is exceeded.

After transmission of the feedback data to the model content narratives 150, feedback data may be collected at block 155 in connection with the transmission. Data reflecting consumption of the content (e.g., consumption in response to or proximate to the display of the content curation) may be collected and transmitted back to playlist generator 130 or discriminator module 140 and result in reprogramming or training of the generator 130/discriminator 140 such as based upon analysis of the generated content, related content consumption, and profile data. For example, a Tivo Edge™ device may be programmed to store records of consumption of the content before and immediately after the generated content curation and also consumption of the content in response to other content curation and/or consumption of content absent a proximate display of any content curation.

Returning back to decision block 145, if it is determined that the playlist is not validated then in one embodiment, the playlist is modified at block 147. In one embodiment, the system 100 identifies one or more candidate segments of the candidate playlist that caused the content signature vector of the candidate content to not match. The system then retrieves one or more new candidate segments from the database 135 (e.g., using playlist generator 130 to identify another match) and replaces the identified one or more candidate segments with the one or more new candidate segments. The process is repeated by the discriminator 140 to validate the modified playlist including the one or more new candidate segments. In one embodiment, the process may continue to be repeated until a modified playlist is validated.

Figure 2:
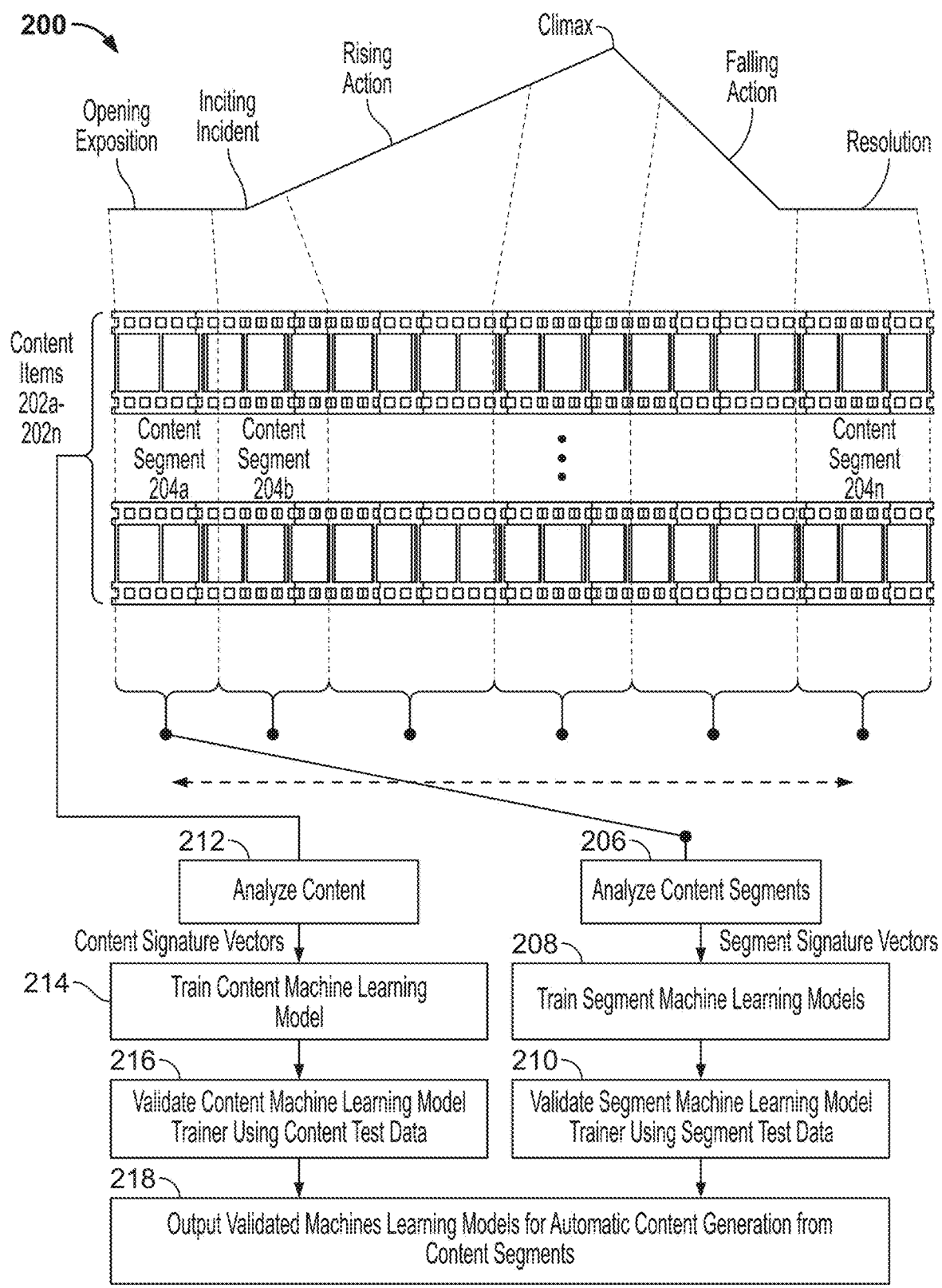
FIG. 2 depicts a flowchart of an illustrative process for training machine learning models for automatic content generation from content segments.

FIG. 2 depicts a flowchart of an illustrative process 200 for training machine learning models for automatic content generation from content segments. In one embodiment, process 200 is used to train the machine learning models used by playlist generator 130 and discriminator 140 of FIG. 1. As shown, content items 202a-202n are inputs to the process. In one embodiment, content item includes media content. Some examples of media content include audio, video, text, AR, VR, etc. Each of content items 202a-202n includes a plurality of content segments 204a-204n that follow a narrative structure. For example, content segments 204a-204n of each of the content items 202a-202n may correspond to a story that follows a narrative structure (e.g., a sci-fi adventure) that includes a plurality of narrative portions having temporal order such as an opening exposition, inciting incident, rising action, climax, falling action and resolution. Each of the content segments corresponds to the one of the plurality of the narrative portions. In one embodiment, at step 206, content segments 204a-204n are analyzed to generate segment signature vectors. In one embodiment, all of the opening exposition narrative portions of content items 202a-n are analyzed to generate segment signature vectors that are then further processed. Then each of the remaining narrative portions of content items 202a-n are analyzed to generate additional sets of segment signature vectors, where each set of segment signature vectors corresponds to a different narrative portion. For example, segment signature vectors represent characteristics associated with one or more video frames of content segments. Such characteristics includes texture, intensity (light or audio), background color, weather, noise (background, foreground etc.) character information (type or number), image recognition of characters, temporal data, corresponding to at least one frame of a video. Signature vector components relate to values of the characteristics such as range of texture values, light intensity value, shape intensity values, audio frequency values etc. and changes over time to those values. In one embodiment, the segment signature vectors are generated using mathematical operations performed on one or more frames of the content segments 204a-204n. For one illustrative example, a signature vector component corresponds to light intensity. In one embodiment of this example, the signature vector component corresponding to light intensity comprises the real time values of light intensity of each pixel in each frame of a segment. In another embodiment of this example, the signature vector component corresponding to light intensity comprises an average light intensity of each frame of the segment. In another embodiment of this example, the signature vector component corresponding to light intensity comprises an average light intensity across multiple frames (e.g., over 1 second intervals) of the segment. In another embodiment of this example, the signature vector component corresponding to light intensity comprises an average light intensity of the frames across the entire segment. Systems and methods for generating signature vectors are discussed in greater detail in connection with U.S. patent application Ser. No. 16/698,618 filed Nov. 27, 2019, and U.S. patent application Ser. No. 16/698,625 filed Nov. 27, 2019, both of which are incorporated by reference herein in their entireties.

In one embodiment, at step 208, the process 200 trains a plurality of segment machine learning models using the segment signature vectors generated at step 206 to output trained segment machine learning models. The segment machine learning models are trained to identify known good content segments similar to the content segments 204a-204n. In one embodiment, segment signature vectors of bad content or content from different types of narrative structure are also used to train the segment machine learning models to better enable the models to differentiate between good content segments and bad content segments. For example, the good content segments may follow an expected variation in light intensity and the bad content segments may follow different variations in light intensity. In some embodiments, training the segment machine learning models includes iteratively determining weights for a neural network while minimizing a loss function to optimize the weights. In some embodiments, segment machine learning models include a neural network, a Bayesian network, any suitable computational characterization model, or any combination thereof. Systems and methods for training segment machine learning models are discussed in greater detail in connection with U.S. Provisional Patent Application No. 62/979,785 filed Feb. 21, 2020 and U.S. Provisional Patent Application No. 62/979,784 filed Feb. 21, 2020, both of which are incorporated by reference in their entireties. In some embodiments, a segment machine learning model output includes a value, a vector, a range of values, any suitable numeric representation for determining whether a content segment matches the model, or any suitable combination thereof.

The process 200 validates the trained segment machine learning models using segment test data at step 210. In one embodiment, the segment content test data includes good content segments (or their corresponding signature vectors)

and the test data is inputted to the trained segment machine learning models to validate the models. For example, a model trained sufficiently well is expected to find a match when test data of good content segments are inputted into the model. In one embodiment, the test data also includes bad content segments, which are not similar to the segments used to train the model. A model trained sufficiently well is also expected to not find a match when test data of bad content segments are inputted into the model. Accordingly, a well-trained model is expected to discriminate between good and bad content segments. In some embodiments, the trained segment machine learning models that have sufficient performance are outputted as validated segment machine learning models at block 218. In one embodiment the segment machine learning model is outputted via a local network. In another embodiment, the segment machine learning model is outputted via a communications network (e.g., communication network 604 of FIG. 6).

In one embodiment, at step 212, the content items 202a-202n are analyzed to generate content signature vectors. The content signature vectors represent characteristics associated with the entire content of the content items. Such characteristics includes texture, intensity (light or audio), background color, weather, noise (background, foreground etc.) character information (type or number), image recognition of characters, temporal data, corresponding to the entire content of the content item. Signature vector components relate to values of the characteristics such as range of texture values, light intensity value, shape intensity values, audio frequency values etc. and changes over time to those values. In one embodiment, the content signature vectors are generated using mathematical operations performed on entire content of each of the content items 202a-202n. For one illustrative example, a signature vector component corresponds to light intensity. In one embodiment, the content signature vectors generated in step 212 are the same or similar to the segment signature vectors generated in step 206, but represent the entire content items as opposed to segments of the content items. Systems and methods for generating signature vectors, are discussed in greater detail in connection with U.S. patent application Ser. No. 16/698,618 filed Nov. 27, 2019, and U.S. patent application Ser. No. 16/698,625 filed Nov. 27, 2019, both of which are incorporated by reference herein in their entireties In one embodiment, at step 214, the process 200 trains a content machine learning model using the content signature vectors generated at step 212 to output a trained content machine learning model. The content machine learning model is trained to identify known good content items similar to the content items 202a-202n. In one embodiment, the content signature vectors of bad content or content of different narrative structures are also used to train the content machine learning model to better enable the model to differentiate between the good content items and bad content items. For example, the good content item may follow an expected variation in sound level and the bad content item may follow different variations in sound level. In some embodiments, training the content machine learning model includes iteratively determining weights for a neural network while minimizing a loss function to optimize the weights. In some embodiments, training the content machine learning model includes iteratively determining weights for a neural network while minimizing a loss function to optimize the weights. In some embodiments, content machine learning models include a neural network, a Bayesian network, any suitable computational characterization model, or any combination thereof. Systems and methods for training content machine learning models are discussed in greater detail in connection with U.S. Provisional Patent Application No. 62/979,785 filed Feb. 21, 2020 and U.S. Provisional Patent Application No. 62/979,784 filed Feb. 21, 2020, both of which are incorporated by reference in their entireties. In some embodiments, a content machine learning model output includes a value, a vector, a range of values, any suitable numeric representation for determining a content, or any suitable combination thereof.

The process 200 validates the trained content machine learning model using content test data at step 216. In one embodiment, the content test data includes good content items (or their corresponding signature vectors) and the test data is inputted to the trained content machine learning model to validate the models. For example, a model trained sufficiently well is expected to find a match when test data of good content items are inputted into the model. In one embodiment, the test data also includes bad content items, which are not similar to the content items used to train the model. A model trained sufficiently well is also expected to not find a match when test data of bad content items are inputted into the model. Accordingly, a well-trained model is expected to discriminate between good and bad content items. In some embodiments, the trained content machine learning model that have sufficient performance is outputted as validated content machine learning model at the block 218. In one embodiment the content machine learning model is outputted via a local network. In another embodiment, the segment machine learning model is outputted via a communications network (e.g., communication network 604 of FIG. 6).

Figure 3:
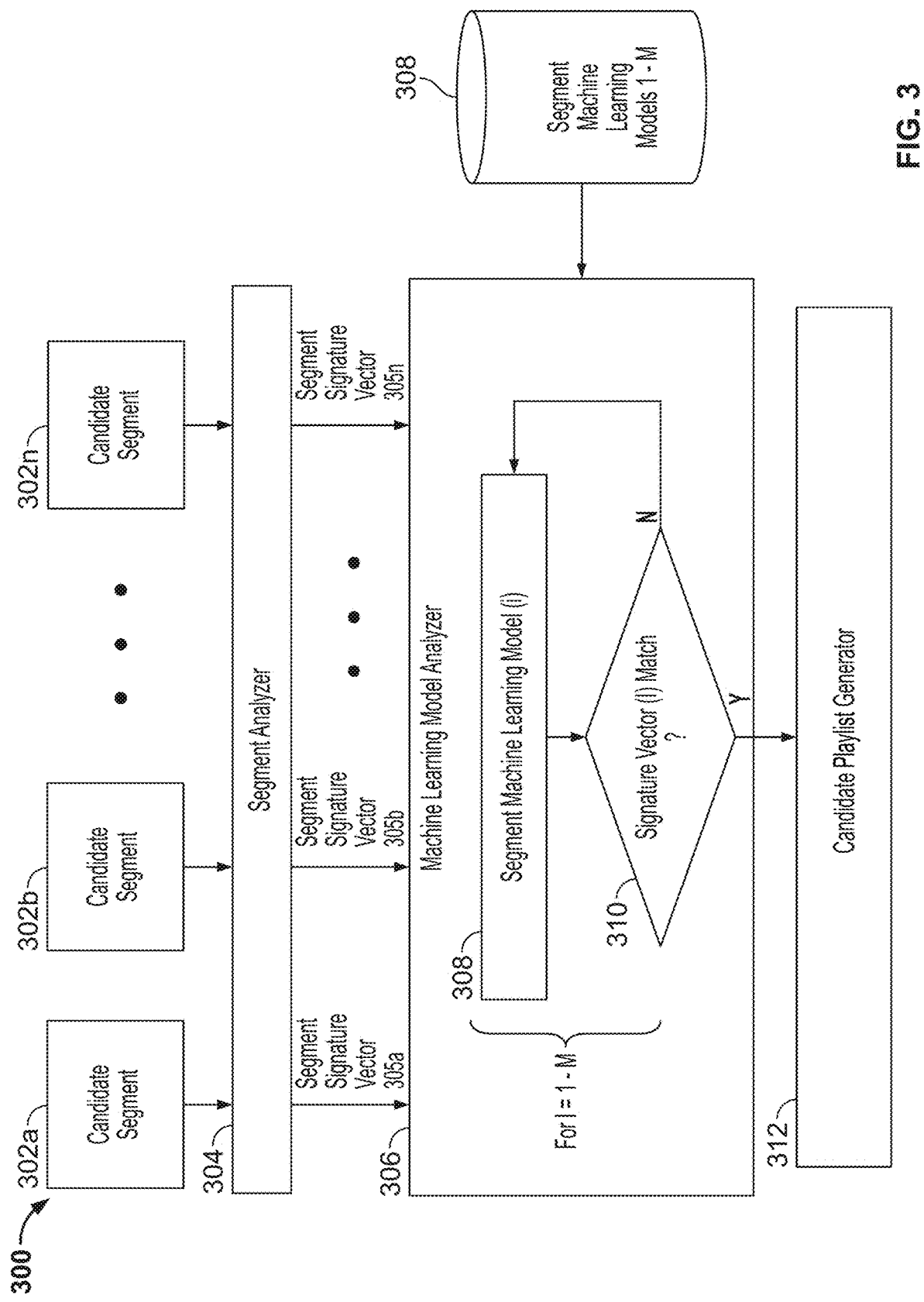
FIG. 3 shows an illustrative of a content curation system of generating playlist of content segments using a segment machine learning model.

FIG. 3 shows an illustrative flowchart of a system 300 (e.g. playlist generator 130 of FIG. 1) generating a playlist of content segments using segment machine learning models generated from, for example, the process 200 of FIG. 2. In one embodiment, content is media content. Some examples of media content include audio, video, text, AR, VR, etc. In one embodiment, a plurality of candidate segments 302a-302n are each analyzed by a segment analyzer 304. The segment analyzer 304 generates segment signature vectors 305a-305n corresponding to respective candidate segments 302a-302n based on content of each of the candidate segments. As discussed above, in one embodiment, the segment signature vectors, or components thereof, are generated based on characteristics corresponding with audio of the content. Also, as discussed above, in some embodiments, the segment signature vectors are generated based on characteristics corresponding with video frames of the content. In one embodiment, each of the segment signature vectors 305a-305n are analyzed by a machine learning model analyzer 306. In one embodiment, the machine learning model analyzer 306, for each narrative portion of a narrative structure having a defined order, retrieves a segment machine learning model 308 among a plurality of segment machine learning models 308a-308m. In one embodiment, the segment machine learning model is retrieved via a local network. In another embodiment, the segment machine learning model is retrieved via a communications network (e.g., communication network 604 of FIG. 6), The machine learning model analyzer 306 further compares the segment signature vector 305a-305n with the segment signature vectors corresponding to the segments of each of the retrieved segment machine learning models 308 (1-M) to determine if there is a match at block 310. In one example, the retrieved segment machine learning models analyze the segment signature vectors until a match is found for each model. If at block 310, it is determined that a segment signature vector does not match with the retrieved segment machine learning model, then the machine learning model analyzer 306 repeats the process by analyzing the next segment signature vector. If for example, at block 310, it is determined that the segment signature vector matches, then the machine learning model analyzer 306 identifies the candidate segment 305 as a match. Then, a playlist of the candidate segments whose signature vectors are identified as matches is generated by a generator 312.

Figure 4:
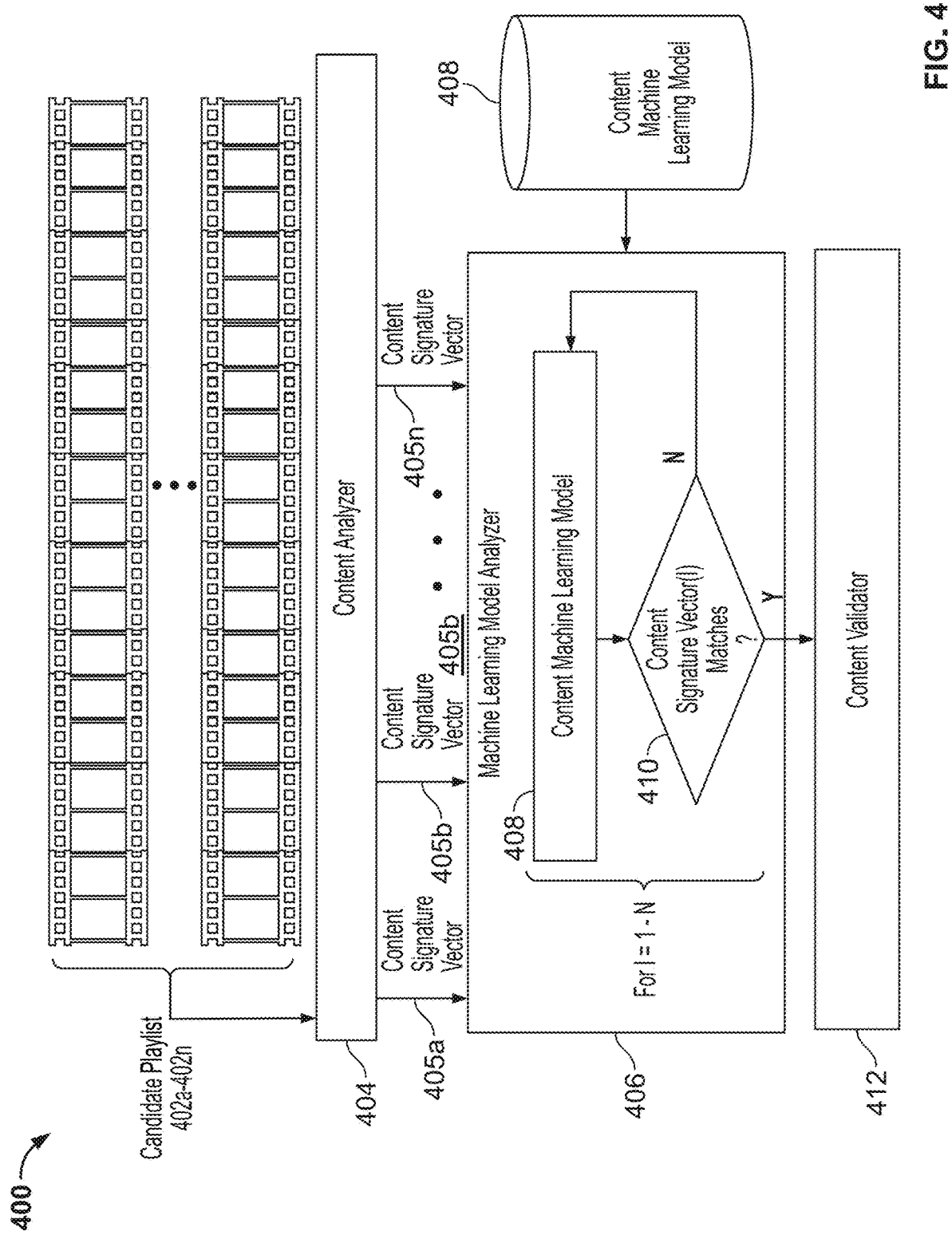
FIG. 4 shows an illustrative of a content curation system of validating playlist of content segments using a content machine learning model.

FIG. 4 shows an illustrative flowchart of a system 400 (e.g., discriminator 140) for validating a playlist (e.g., a playlist generated in FIG. 3) utilizing a content machine learning model (e.g., a content machine learning model trained in FIG. 2). In one embodiment, a plurality of candidate playlists 402a-402n are analyzed by a content analyzer 404. In one embodiment, the candidate playlist is media content. Some examples of media content include audio, video, text, AR, VR, etc. Each of the candidate playlists 402a-402n include at least two or more candidate segments in a defined order of a narrative structure. The content analyzer 404 generates content signature vectors 405a-405n corresponding to respective candidate playlists 402a-402n based on content of each of the candidate segments. As discussed above, in one embodiment, the content segment signature vectors, or components thereof, are generated based on characteristics corresponding with audio of the content. Also, as discussed above, in one embodiment, the content segment signature vectors are generated based on characteristics corresponding with video frames of the content. Each of the content segment signature vectors 405a-n are analyzed by a machine learning model analyzer 406. In one embodiment, the machine learning model analyzer 406 retrieves a content machine learning model 408 for a content playlist having segments in the defined order of a narrative structure. In one embodiment the content machine learning model is retrieved via a local network. In another embodiment, the content machine learning model is retrieved via a communications network (e.g., communication network 604 of FIG. 6)

The machine learning model analyzer 406 compares the content segment signature vector 405a-405n of each of the candidate playlists 402a-402n with the content signature vector corresponding to the content playlist of the content machine learning model 408 to determine if there is a match at block 410. If at block 410, it is determined that a content signature vector among the content signature vectors 405a-n of corresponding candidate playlists 402a-402n does not match with content signature vector of the content playlist of the content machine learning model 408, then the machine learning model analyzer 406 repeats the process of analyzing another content signature vector among the content signature vectors 405a-405n of corresponding candidate playlists 402a-402n. In one embodiment, a playlist from candidate playlists 402a-402n whose content signature vector is found to match is validated by a content validator 412. In one example, the candidate playlist is validated when the content signature vector of the entire content of the candidate playlist includes characteristics such as character information such as number of characters, type of characters (male, female, etc.), voice of characters etc. that are similar to the character information corresponding to the content signatures in the entire content playlist of the content machine learning model 408. In one embodiment, the playlist is validated to determine whether the segments in the playlist follow the narrative structure. In one embodiment, the validated playlist is distributed to be presented on a user interface.

Figure 5:
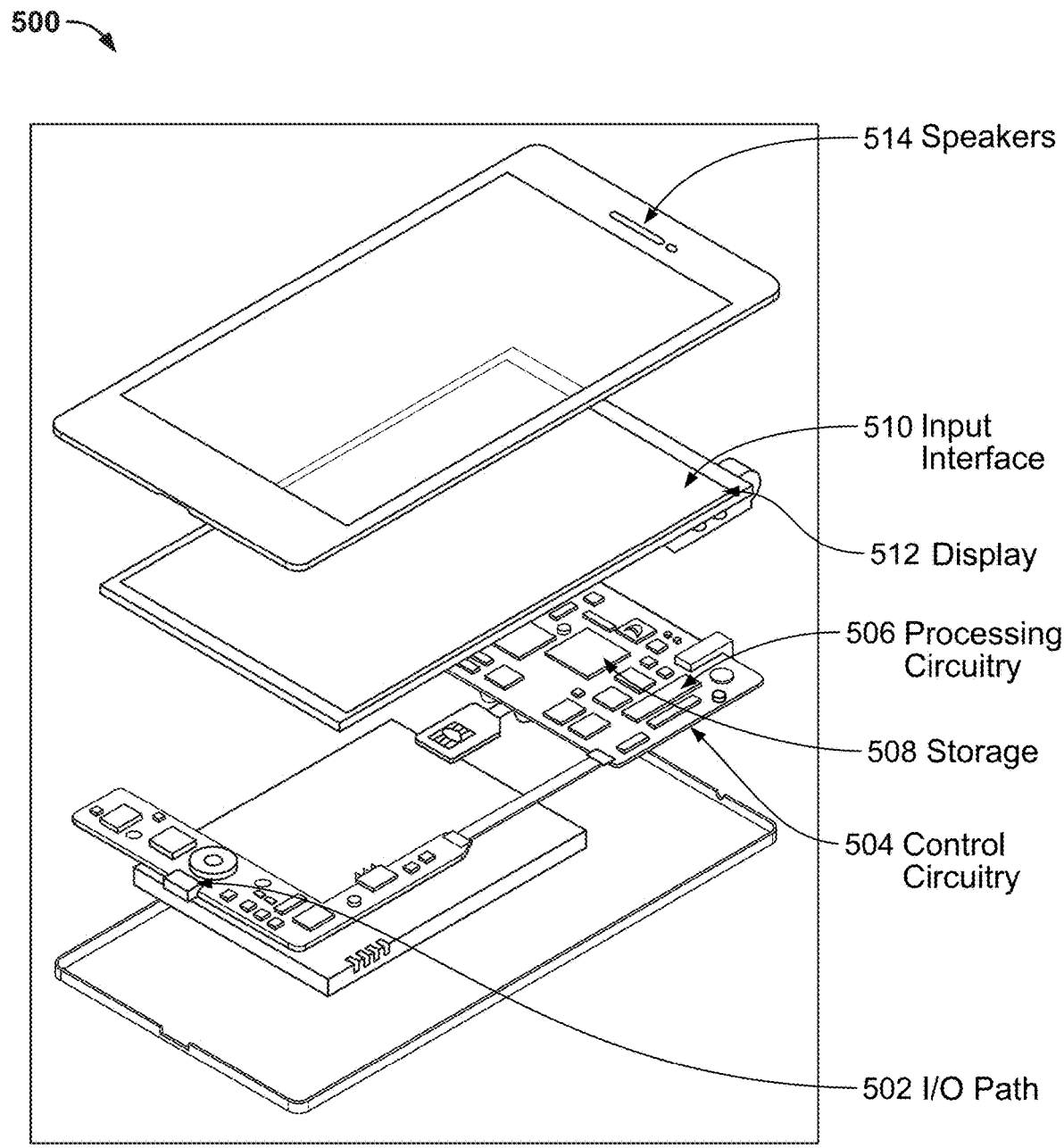
FIG. 5 is a block diagram of an illustrative device for curating content using a content curation system, in accordance with some embodiments of the disclosure.

In some embodiments, the methods and systems described in connection with FIGS. 1-4 utilize a device on which to curate content. FIG. 5 is a block diagram of an illustrative device 500, in accordance with some embodiments of the present disclosure. As referred to herein, device 500 should be understood to mean any device that can curate content. As depicted, device 500 may be a smartphone or tablet, or may additionally be a personal computer or television equipment. In some embodiments, device 500 may be an augmented reality (AR) or virtual reality (VR) headset, smart speakers, or any other device capable of outputting curated content.

Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for causing to curate content based on signature analysis of the content. In one embodiment, content is media content. Some examples of media content include audio, video, text, AR, VR, etc.

An application on a device may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, and executed by control circuitry 504 of device 500.

In some embodiments, an application may be a client-server application where only the client application resides on device 500 (e.g., device 602), and a server application resides on an external server (e.g., server 606). For example, an application may be implemented partially as a client application on control circuitry 504 of device 500 and partially on server 606 as a server application running on control circuitry. Server 606 may be a part of a local area network with device 602, or may be part of a cloud computing environment accessed via the Internet. In a cloud computing environment, various types of computing services for performing searches on the Internet or informational databases, gathering information for a display (e.g., information for curating content for display), or parsing data are provided by a collection of network-accessible computing and storage resources (e.g., server 606), referred to as "the cloud." Device 500 may be cloud clients that rely on the cloud computing capabilities from server 606 to gather data to populate an application. When executed by control circuitry of server 606, the system may instruct the control circuitry to curate content on device 602. The client application may instruct control circuitry of the receiving device 602 to curate content for output. Alternatively, device 602 may perform all computations locally via control circuitry 504 without relying on server 606.

Control circuitry 504 may include communications circuitry suitable for communicating with a content server or other networks or servers. The instructions for carrying out the above-mentioned functionality may be stored and executed on server 606. Communications circuitry may include a cable modem, a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500. User input interface 510 may be any suitable user interface touchscreen, touchpad, stylus and may be responsive to external device add-ons such as a remote control, mouse, trackball, keypad, keyboard, joystick, voice recognition interface, or other user input interfaces. User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content while audio content may be played through speakers 514. In some embodiments, the audio may be distributed to a receiver (not shown), which processes and outputs the audio via speakers 514.

Control circuitry 504 may allow a user to provide user profile information or may automatically compile user profile information. For example, control circuitry 504 may track user preferences for different content signatures and content curation. In some embodiments, control circuitry 504 monitors user inputs, such as queries, texts, calls, conversation audio, social media posts, etc., to detect user preferences. Control circuitry 504 may store the user preferences in the user profile. Additionally, control circuitry 504 may obtain all or part of other user profiles that are related to a particular user (e.g., via social media networks), and/or obtain information about the user from other sources that control circuitry 504 may access. As a result, a user can be provided with personalized curated content.

Figure 6:
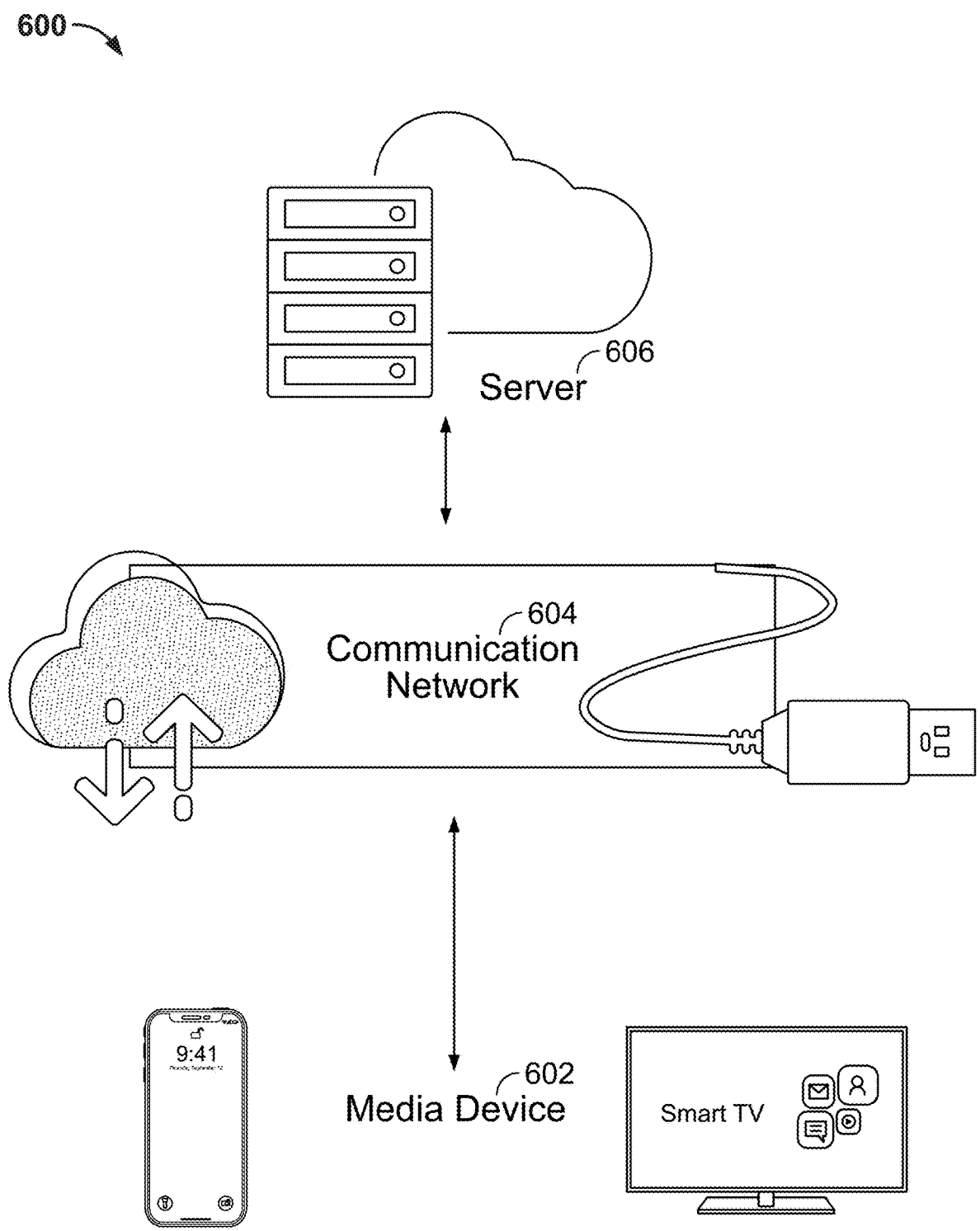
FIG. 6 is a block diagram of an illustrative system for curating content using a content curation system, in accordance with some embodiments of the disclosure.

Device 500 of FIG. 5 can be implemented in system 600 of FIG. 6 as device 602. Devices from which curated content may be output may function as a standalone device or may be part of a network of devices. Various network configurations of devices may be a smartphone or tablet, or may additionally be a personal computer or television equipment. In some embodiments, device 602 may be an augmented reality (AR) or virtual reality (VR) headset, smart speakers, or any other device capable of outputting curated content to a user.

In system 600, there may be multiple devices but only one of each type is shown in FIG. 6 to avoid overcomplicating the drawing. In addition, each user may utilize more than one type of device and also more than one of each type of device.

As depicted in FIG. 6, device 602 may be coupled to communication network 604. Communication network 604 may be one or more networks including the Internet, a mobile phone network, mobile voice or data network (e.g., a 4G or LTE network), cable network, public switched telephone network, Bluetooth, or other types of communications network or combinations of communication network. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 7-10. It should be noted that the steps of processes 700, 800, 900, and 1000 of FIGS. 7-10, respectively, may be performed by control circuitry 504 of FIG. 5.

Figure 7:
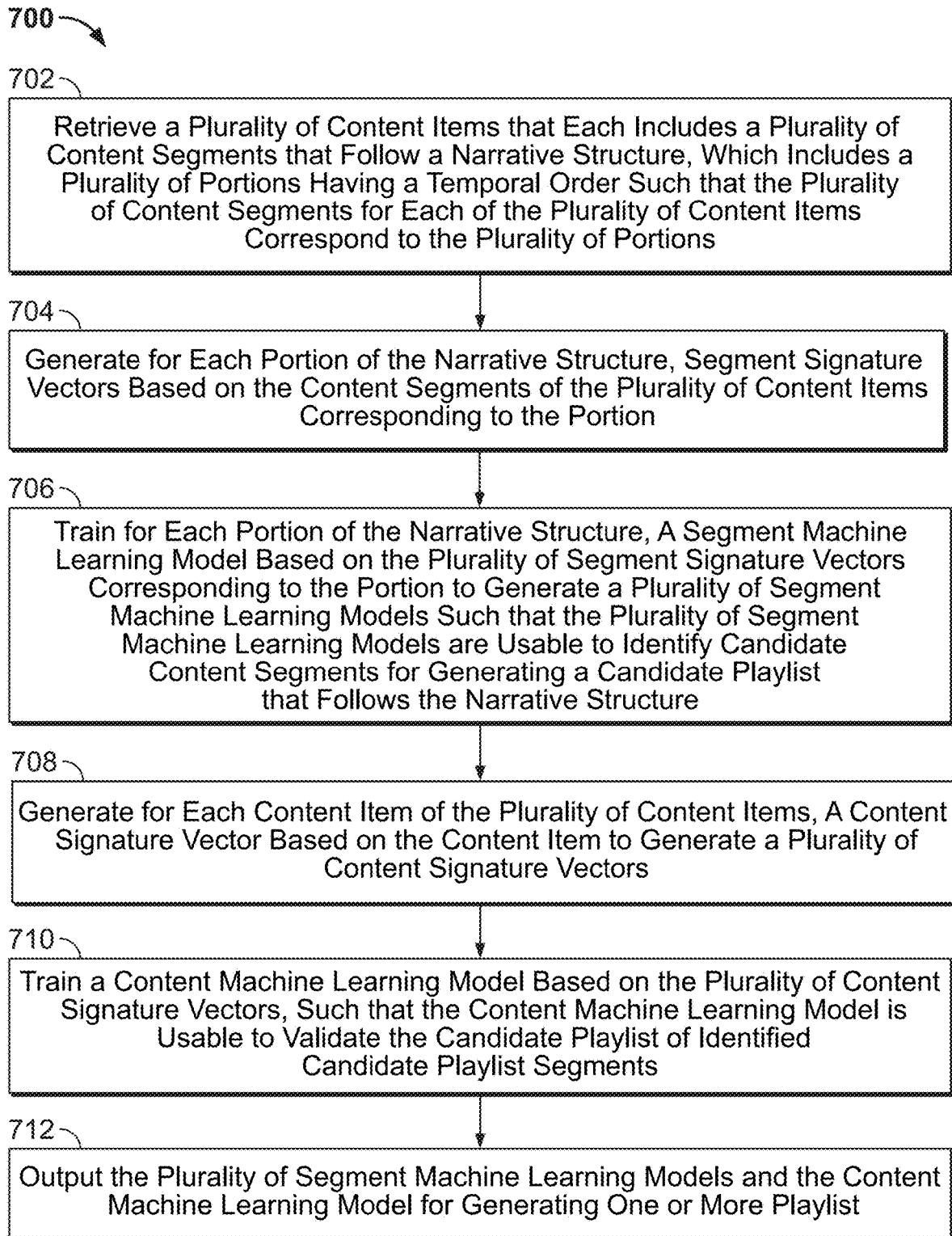
FIG. 7 depicts a flowchart of an illustrative process for generating segment machine learning models and content machine learning model in accordance with some embodiments of the disclosure.

FIG. 7 depicts a flowchart of an illustrative process 700 for generating segment machine learning models and content machine learning model in accordance with some embodiments of the disclosure. It should be noted that the steps of the process 700 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 702, the control circuitry retrieves a plurality of content items. In one embodiment, content item includes media content. Some examples of media content include audio, video, text, AR, VR, etc. In one embodiment, the plurality of content items are retrieved from a local network. In another embodiment, the plurality of content items are retrieved via a communication network (e.g., communication network 604 of FIG. 6). Each of the plurality of content items includes a plurality of content segments that follow a narrative structure. The narrative structure includes a plurality of portions having a temporal order, and the plurality of content segments for each of the plurality of content items, correspond to the plurality of portions. At step 704, the control circuitry generates, for each portion of the narrative structure, segment signature vectors based on the content segments of the plurality of content items corresponding to the portion to generate a plurality of segment signature vectors. In one embodiment, step 704 generates the segment signatures vectors as described above in connection with step 206 of FIG. 2. At step 706, the control circuitry trains, for each portion of the narrative structure, a segment machine learning model based on the plurality of segment signature vectors corresponding to the portion to generate a plurality of segment machine learning models. In one embodiment, step 706 generates the plurality of segment machine learning models as described above in connection with step 208 of FIG. 2. The plurality of segment machine learning models are usable to identify candidate content segments for generating a candidate playlist that follows the narrative structure.

At step 708, the control circuitry generates for each content item of the plurality of content items, a content signature vector based on the content item to generate a plurality of content signature vectors. In one embodiment, step 708 generates the content signatures vectors as described above in connection with step 212 of FIG. 2. At step 710, the control circuitry trains a content machine learning model based on the plurality of content signature vectors. In one embodiment, step 710 generates the plurality of segment machine learning models as described above in connection with step 214 of FIG. 2. The content machine learning model is usable to validate the candidate playlist of identified candidate content segments. At step 712, the control circuitry outputs the plurality of segment machine learning models and the content machine learning model for generating one or more playlists. In one embodiment the segment machine learning models and the content machine learning model are outputted via a local network. In another embodiment, the segment machine learning models and the content machine learning model is outputted via a communications network (e.g., communication network 604 of FIG. 6)

Figure 8:
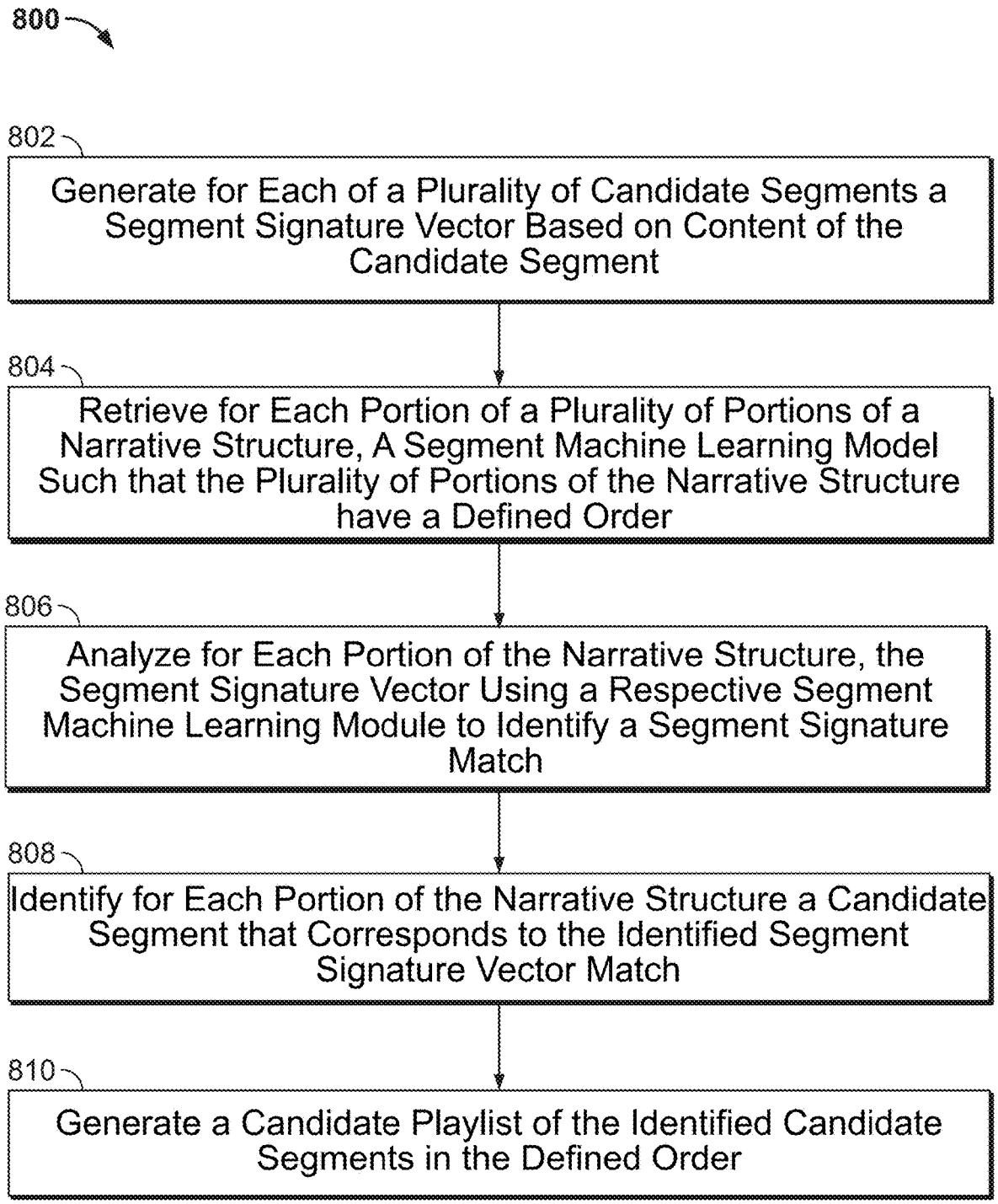
FIG. 8 depicts a flowchart of an illustrative process for generating a candidate playlist utilizing the generated segment machine learning models, in accordance with some embodiments of the disclosure.

FIG. 8 depicts a flowchart of an illustrative process 800 for generating a candidate playlist utilizing the generated segment machine learning models, in accordance with some embodiments of the disclosure. It should be noted that the steps of the process 800 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 802, the control circuitry generates for each of a plurality of candidate segments a segment signature vector based on content of the candidate segment. In one embodiment, the content is media content. Some examples of media content include audio, video, text, AR, VR, etc. Segment signature vector represents information describing important characteristics of the content segment. As referred to herein, in some embodiments, a segment signature vector is generated based on video frames of the content segment. In some embodiments, the segment signature vector is generated based on the entire content of the content segment. In one embodiment, the segment signature vectors represent characteristics associated with one or more audio segments or tracks of content. In one example, a segment signature vector may include signature analysis of a frequency range of the audio, such as background noise, foreground noise, volume of voice of character, pitch of the voice etc. in a video frame. For example, when a video frame is of a beach scene with the ocean, waves of the ocean make sound that have certain characteristics that can be identified using signature analysis. In one embodiment, segment signature vectors represent characteristics associated with one or more video frames of the content. Such characteristics includes texture, intensity (light), background color, weather character information (type or number), image recognition of characters, temporal data, etc. corresponding to at least one frame of a video. At step 804, the control circuitry retrieves, for each portion of a plurality of portions of a narrative structure (e.g., a sci-fi adventure), a segment machine learning model. The plurality of portions of the narrative structure have a defined order. At step 806, the control circuitry analyzes for each portion of the narrative structure the segment signature vector using a respective segment machine learning model to identify a segment signature vector match. In one embodiment, the segment signature vector of the candidate segment may include characteristics such as background noise which is similar to the background noise of the segment signature vector of the segment machine learning model. In one embodiment, step 806 is performed by machine learning model analyzer 306 of FIG. 3 as explained above. At step 808, the control circuitry identifies, for each portion of the narrative structure, a candidate segment that corresponds to the identified segment signature vector match. At step 810, the control circuitry generates a candidate playlist of the identified candidate segments in the defined order.

Figure 9:
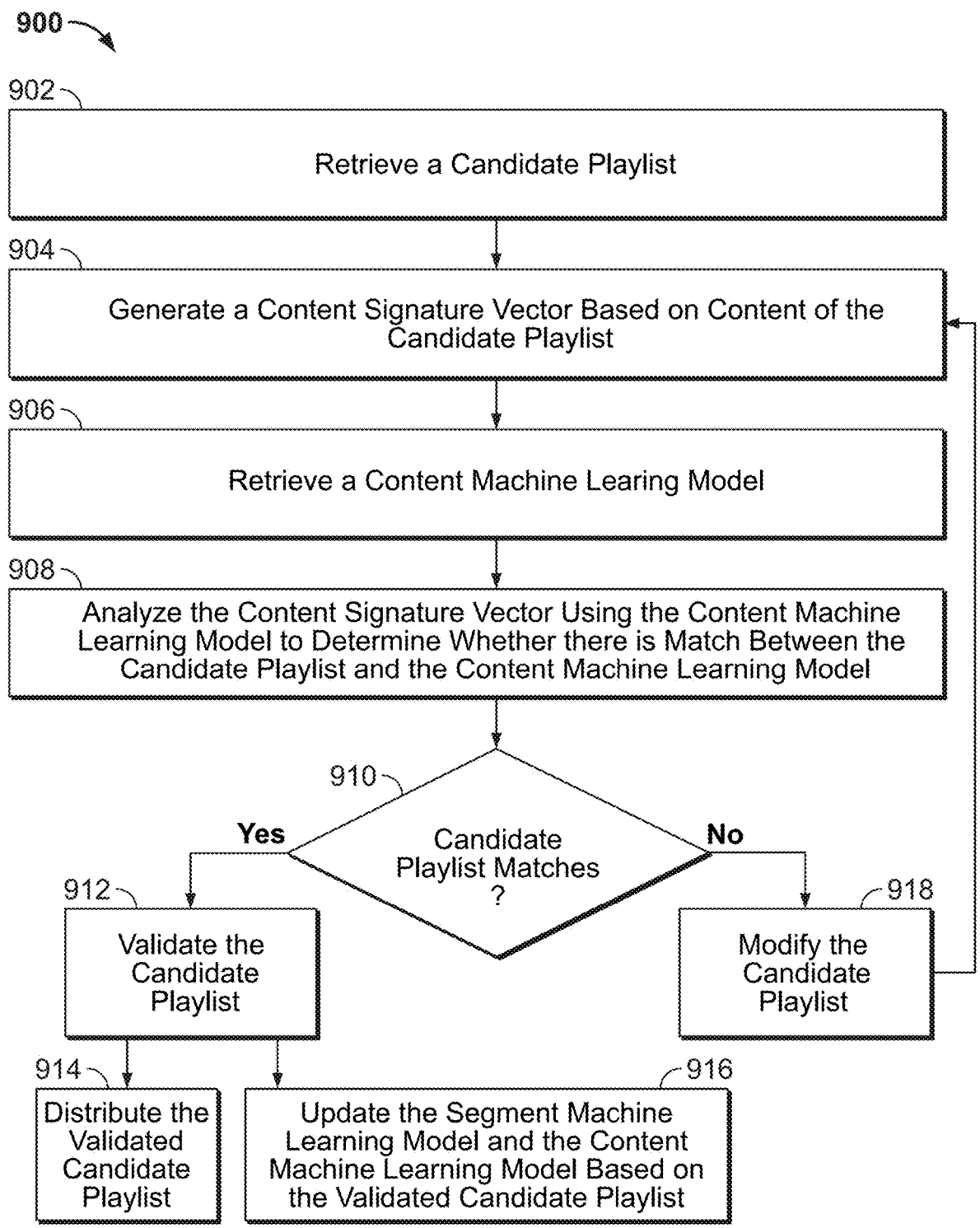
FIG. 9 depicts a flowchart of an illustrative process for validating the generated candidate playlist utilizing the generated content machine learning model, in accordance with some embodiments of the disclosure.

FIG. 9 depicts a flowchart of an illustrative process 900 for validating a generated candidate playlist utilizing the generated content machine learning model, in accordance with some embodiments of the disclosure. It should be noted that the steps of the process 900 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 902, the control circuitry retrieves a candidate playlist (e.g., a playlist generated at step 810 of FIG. 8). In one embodiment, candidate playlist is media content. Some examples of media content include audio, video, text, AR, VR, etc. As discussed above, the candidate playlist includes the identified candidate segments in a defined order. At step 904, the control circuitry generates a content signature vector based on content of the candidate playlist. In one embodiment, step 904 is performed by content analyzer 404 of FIG. 4 as explained above. At step 906, the control circuitry retrieves a content machine learning model. At step 908, the control circuitry analyzes the content signature vector using the content machine learning model to determine whether there is match between the candidate playlist and the content machine learning model. In one embodiment, step 908 is performed by machine learning model analyzer 406 of FIG. 4 as explained above. At step 910, the control circuitry determines whether the candidate playlist matches with the content machine learning model. If the control circuitry determines that the candidate playlist matches with the content machine learning model, then at step 912, the control circuitry validates the candidate playlist. In one embodiment, the content signature vector of the candidate playlist may include characteristics such as light intensity which is similar to the light intensity of the content signature vector of the content machine learning model. At step 914, the control circuitry distributes the validated candidate playlist. At step 916, the control circuitry updates the segment machine learning model and the content machine learning model based on the validated candidate playlist. Step 914 and 916 may be performed prior to one another or in parallel with each other. In one embodiment, step 916 is not performed. If the control circuitry determines that the candidate playlist does not match with the content machine learning model, then at step 918, the control circuitry modifies the candidate playlist and repeats steps 904-910.

FIG. 10 depicts a flowchart of an illustrative process 1000 for modifying the generated candidate playlist, in accordance with some embodiments of the disclosure. It should be noted that the steps of the process 1000 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 1002, the control circuitry identifies one or more candidate segments among the plurality of segments of the candidate playlist that caused the candidate playlist to not match the content machine learning model. In one embodiment, the candidate playlist is media content. Some examples of media content include audio, video, text, AR, VR, etc. In one embodiment, an output of a content machine learning model includes information indicating which segment or segments caused a candidate playlist to fail. For example, multiple outputs may be used that indicate consistency between each pair of adjacent segments. When there is poor consistency between two adjacent segments, one of the two segments may be identified as causing the candidate playlist to not match. At step 1004, the control circuitry retrieves one or more new segments of the plurality of segments of the narrative structure. In one embodiment, playlist generator 130 of FIG. 1, using one or more appropriate segment machine learning models, identifies the new one or more segments. At step 1006, the control circuitry replaces the identified one or more candidate segments with the retrieved new one or more segments. At step 1008, the control circuitry generates a modified candidate playlist using the replaced one or more segments.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for curating content, the method comprising:
retrieving a plurality of content items, wherein each of the plurality of content items comprises a plurality of content segments that follow a narrative structure, wherein the narrative structure comprises a plurality of portions having a temporal order, and wherein the plurality of content segments for each of the plurality of content items, correspond to the plurality of portions;
generating, for each portion of the narrative structure, segment signature vectors based on the content segments of the plurality of content items corresponding to the portion;
training, for each portion of the narrative structure, a segment machine learning model based on the plurality of segment signature vectors corresponding to the portion to generate a plurality of segment machine learning models, wherein the plurality of segment machine learning models are usable to identify candidate content segments for generating a candidate that follows the narrative structure;

generating, for each content item of the plurality of content items, a content signature vector based on the content item to generate a plurality of content signature vectors;

training a content machine learning model based on the plurality of content signature vectors, wherein the content machine learning model is usable to validate the candidate playlist of identified candidate content segments; and outputting the plurality of segment machine learning models and the content machine learning model for generating one or more playlists.

2. The method of claim 1 wherein outputting the plurality of segment machine learning models comprises making the plurality of segment machine learning models and the content machine learning model available for generating one or more playlists from a plurality of candidate segments.

3. The method of claim 1 further comprising validating each of the segment machine learning models using test content segments.

4. The method of claim 3 wherein the validating, for each of the segment machine learning models, comprises analyzing the test content segments using the segment machine learning model to identify a match.

5. The method of claim 1 further comprising validating the content machine learning model using a plurality of test content items.

6. The method of claim 5 wherein the validating comprises analyzing the test content items using the content machine learning model to identify a match.

7. The method of claim 1 wherein the segment machine learning model comprises at least one neural network or a Bayesian network.

8. The method of claim 1 wherein the content machine learning model comprises at least one neural network or a Bayesian network.

9. The method of claim 1 wherein generating, for each content item of the plurality of content items, the content signature vector comprises applying mathematical operations across all of the content item.

10. The method of claim 1 wherein the segment signature vectors are generated based on characteristics associated with one of audio of the content, video frames of the content or combinations thereof.

11. A system comprising:
memory; and
control circuitry configured to:
retrieve a plurality of content items, wherein each of the plurality of content items comprises a plurality of content segments that follow a narrative structure, wherein the narrative structure comprises a plurality of portions having a temporal order, and wherein the plurality of content segments for each of the plurality of content items, correspond to the plurality of portions;

generate, for each portion of the narrative structure, segment signature vectors based on the content segments of the plurality of content items corresponding;

train, for each portion of the narrative structure, a segment machine learning model based on the plurality of segment signature vectors corresponding to the portion to generate a plurality of segment machine learning models, wherein the plurality of segment machine learning models are usable to identify candidate content segments for generating a candidate playlist that follows the narrative structure;

generate, for each content item of the plurality of content items, a content signature vector based on the content item to generate a plurality of content signature vectors;

train a content machine learning model based on the plurality of content signature vectors, wherein the content machine learning model is usable to validate the candidate playlist of identified candidate content segments; and output the plurality of segment machine learning models and the content machine learning model for generating one or more playlists.

12. The system of claim 11 wherein to output the plurality of segment machine learning models, the control circuitry is configured to:
make the plurality of segment machine learning models and the content machine learning model available for generating one or more playlists from a plurality of candidate segments.

13. The system of claim 11 wherein the control circuitry is configured to:
validate each of the segment machine learning models using test content segments.

14. The system of claim 13 wherein to validate each of the segment machine learning models, the control circuitry is configured to:
analyze the test content segments using the segment machine learning model to identify a match.

15. The system of claim 11 wherein the control circuitry is configured to:
validate the content machine learning model using a plurality of test content items.

16. The system of claim 15 wherein to validate the content machine model, the control circuitry is configured to:
analyze the test content items using the content machine learning model to identify a match.

17. The system of claim 11 wherein the segment machine learning model comprises at least one neural network or a Bayesian network.

18. The system of claim 11 wherein the content machine learning model comprises at least one neural network or a Bayesian network.

19. The system of claim 11 wherein to generate, for each content item of the plurality of content items, the content signature vector, the control circuitry is configured to:
apply mathematical operations across all of the content item.

20. The system of claim 11 wherein the segment signature vectors are generated based on characteristics associated with one of audio of the content, video frames of the content or combinations thereof.

* * * * *